United States Patent
Maguire

(10) Patent No.: US 6,850,269 B2
(45) Date of Patent: Feb. 1, 2005

(54) MOBILE TRAFFIC CAMERA SYSTEM

(76) Inventor: James F. Maguire, 9 Randall Ave., Baltimore, MD (US) 21228

( * ) Notice: Subject to any disclaimer, the term of this patent is extended or adjusted under 35 U.S.C. 154(b) by 618 days.

(21) Appl. No.: 09/999,449

(22) Filed: Dec. 3, 2001

(65) Prior Publication Data

US 2003/0128275 A1 Jul. 10, 2003

(51) Int. Cl.7 .................................................. H04N 7/18
(52) U.S. Cl. ....................................... 348/149; 701/211
(58) Field of Search ......................... 348/61, 143, 148, 348/149, 159; 340/905, 933, 934, 935, 988–994, 937; 342/454, 457; 455/456.1; 701/117, 119, 200, 207, 208, 209, 211; H04N 7/18

(56) References Cited

U.S. PATENT DOCUMENTS 5,812,069 A 9/1998 Albrecht et al.
5,908,464 A 6/1999 Kishigami et al.
6,012,012 A 1/2000 Fleck et al.
6,061,625 A 5/2000 Fastenrath
6,101,390 A 8/2000 Jayaraman et al.
6,131,064 A 10/2000 Vieweg Primary Examiner—Young Lee
(74) Attorney, Agent, or Firm—John E. Simms, Jr.

(57) ABSTRACT

A process and a system for receiving compressed streaming video image data, simultaneously and continuously from a plurality of mobile sources, which stamp the data with time, location, and source identification. The data is processed by converting the location stamps to road vector identifications. The time, road vector and source are compared with those of other data received previously and being received concurrently to develop and revise a record comprising a reference to the most recent data, for each road vector and the speed of the mobile source. The data is stored and is retrieved by selected road vector, to display a continuous and coherent video image of the most recently recorded view at the selected road vector, together with the speed of the data source.

8 Claims, 3 Drawing Sheets

GeoLocation Table

| Geo Location | | Road Segment ID | Of Interest ? |
|---|---|---|---|
| Latitude | Longitude | | |
| | | | |
| 76°40'42" | 39°16'27" | 95N001 | Y |
| 76°40'38" | 39°16'29" | 95N002 | Y |
| 76°40'34" | 39°16'31" | 95N003 | Y |
| 76°40'30" | 39°16'33" | 95N004 | Y |
| 76°40'26" | 39°16'35" | 95N005 | Y |
| | | | |
| 76°43'46 | 39°18'43" | 70W924 | N |
| 76°43'42 | 39°18'42" | 70W925 | N |
| 76°43'38 | 39°18'41" | 70W926 | N |
| 76°43'34 | 39°18'40" | 70W927 | N |

Fig. 2

Results Table

| Road Vector | Most Recent Speed | Video Stream ID | Time Offset | If Subsequent VideoStream needed*: *The primary VideoStream is 'retired' (transmission has ceased) before end of route | |
|---|---|---|---|---|---|
| (Road Dir MM) | (mph) | (Day Source Seq#) | (minutes) | (VideoStream ID) | from MileMarker: |
| I-95 NB 37.1 | 62.3 | 207 A 17 | 31.28 | 207 BQ 09 | 42.3 |
| I-95 NB 37.2 | 62.7 | 207 A 17 | 31.37 | 207 BQ 09 | 42.3 |
| I-95 NB 37.3 | 59.8 | 207 A 17 | 31.47 | 207 BQ 09 | 42.3 |
| I-95 NB 37.4 | 61.2 | 207 A 17 | 31.56 | 207 BQ 09 | 42.3 |
| : | : | : | : | : | : |
| : | : | : | : | : | : |
| I-95 NB 41.9 | 54.3 | 207 A 17 | 36.21 | 207 BQ 09 | 42.3 |
| I-95 NB 42.0 | 57.1 | 207 A 17 | 36.33 | 207 BQ 09 | 42.3 |
| I-95 NB 42.1 | 56.8 | 207 A 17 | 36.42 | 207 BQ 09 | 42.3 |
| I-95 NB 42.2 | 60.2 | 207 A 17 | 36.52 | 207 BQ 09 | 42.3 |
| I-95 NB 42.3 | 63.1 | 207 BQ 09 | 40.13 | | |
| I-95 NB 42.4 | 64.9 | 207 BQ 09 | 40.21 | | |
| I-95 NB 42.5 | 62.2 | 207 BQ 09 | 40.31 | | |
| I-95 NB 42.6 | 59.1 | 207 BQ 09 | 40.42 | | |
| I-95 NB 42.7 | 60.7 | 207 BQ 09 | 40.54 | | |
| : | : | : | : | | |

Fig. 3

MOBILE TRAFFIC CAMERA SYSTEM

BACKGROUND OF THE INVENTION

In developed and congested areas, people feel a need to monitor vehicular traffic, to assist them in selecting their mode of transportation and in planning their route. Information gathered from traffic monitoring is useful in both short term planning and long term planning. An individual seeking the fastest route across town, on a particular day may benefit from current traffic monitoring information. The Highway Department may wish to study traffic monitoring data covering a longer time period for planning purposes. Numerous methods have been developed to gather and communicate traffic information. New technology, which provides means for electronically gathering and transmitting information, has contributed to the development of more sophisticated systems.

A variety of devices have been developed which can be positioned near a roadway to collect data including the presence of vehicles and their speed. Some of these devices make use of cameras to collect the data for analysis. For example, see the patent to Bunnen, U.S. Pat. No. 5,912,634, disclosing a monitoring device which produces a photographic image for electronic analysis to determine traffic volume.

A traffic situation can be monitored by a video camera, which provides an actual view of the situation to be monitored, at a remote location. Systems currently in use employ stationary cameras which collect and transmit video images. The cameras are placed in areas which are of interest for monitoring. The video image of vehicular traffic, in an area of interest, provides valuable information, including the density, speed and pattern of movement, in the area being monitored. Although stationary cameras are widely used, these systems cover only the limited area which can be surveyed from the point of installation. Ideally, the range of coverage could be expanded by adding additional camera installations; however, a large number of stationary cameras would be needed to provide complete coverage of a section of highway. Furthermore, the stationary cameras must be weatherproof and are typically mounted on tall towers alongside the roadway. These factors significantly add to the expense of establishing and maintaining a system of multiple stationary cameras.

Other systems employ vehicle mounted data collection devices. The patent to Vieweg, U.S. Pat. No. 6,131,064 provides for the speed of a vehicle together with the location, obtained by a global positioning system, to be input to a computer on the vehicle. The data is analyzed and a result is transmitted to a central collection point. See also U.S. Pat. No. 6,061,625 to Fastenrath for an example of the collection, analysis and transmission of speed data, on a moving vehicle. The use of multiple units and the mobility of the units themselves allows for a greatly expanded area of coverage.

A need exists for an invention which will make use of vehicle mounted data collection which includes a video image with the information presented by the system.

SUMMARY OF THE INVENTION

The present invention is an apparatus which provides, for each roadway being monitored, a recent and coherent video image, with speed data and is a process for collecting, storing, retrieving and displaying the same images and data. A plurality of vehicles are data sources and are equipped with a global positioning system (GPS) receiver, a digital video camera, a video image compressor and means to transmit the GPS data and compressed video images. A central data repository is equipped with receiving units capable of receiving transmitted GPS data and compressed video images from each of the vehicles simultaneously and is equipped with a computer processor capable of collecting, storing, retrieving and displaying the images and data.

A digital video camera is mounted in each vehicle, and positioned so as to capture and digitize images representing the forward looking view from the vehicle. The digital video camera is electrically connected to the video image compressor in a manner which causes the data consisting of the video images to be transferred and compressed. A GPS system, mounted in the vehicle provides data consisting of the vehicle's latitude and longitude, and the time at which the position was defined. The video image compressor and the GPS system are electrically connected to the transmitting means in a manner which transfers the GPS data and compressed video images to the transmitting means immediately. The transmitting means is configured to transmit the compressed video image data to the central repository continuously and to periodically stamp it with the GPS data consisting of a defined position, associated time and source identification.

The central repository consists of receiving units electrically connected to the computer processor in a manner which transfers the time and position-stamped data, from each receiving unit to a computer processor. The computer processor is programmed to recognize the source identification of each data source and to compare at least two time and position stamps, from a given source, with a predetermined matrix and assign a road vector label to the data from the identified source. The road vector label denotes position and direction of travel. The computer processor assigns a road vector label, for each time and position stamp. The computer processor is further programmed to compare each assigned road vector label, to a predetermined schedule of road vector labels and to compare the road vector label, of the data, to the road vector labels of the data for all other data sources being received at that time. The program follows a decision tree or similar format which results in the data from the data source being selected to be stored or not stored.

The computer processor is programmed to retrieve and to display data in response to a request initiated by a person using the invention. The request specifies a particular road vector and is input by any of a number of known means. The computer processor is programmed to retrieve and display the most recently transmitted data selected to be stored and having a road vector label matching the road vector of the user's request. The computer processor is programmed to display the video image and the speed, with the video image consisting of a continuous and coherent view from the selected data source, along with the source's calculated speed.

The computer processor is programmed to retain video image data and speed data, after it is no longer the most recently received data for a road vector, according to a pre-determined selection criteria. The computer processor is programmed to retrieve and display the stored data in response to specifically tailored requests. It is intended that the invention serves to provide the most recent video image and speed data for a particular location and also that the invention serves to store, analyze, retrieve and display data configured for numerous purposes, including long-term analysis of traffic patterns.

BRIEF DESCRIPTION OF THE DRAWINGS

FIG. 2 is a geo-location table.

FIG. 3 is a results table.

DESCRIPTION OF THE PREFERRED EMBODIMENT

Figure 1:
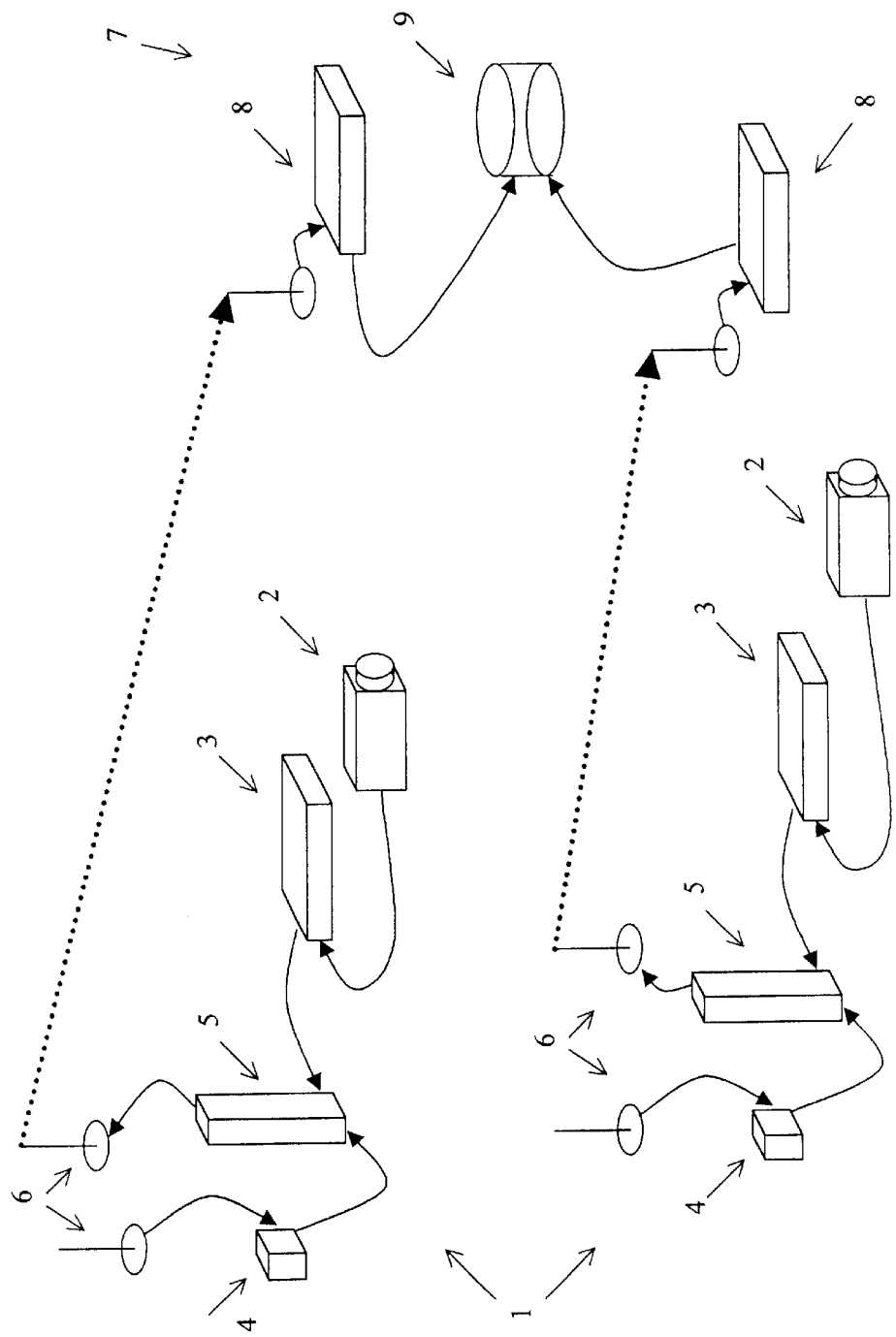
FIG. 1 is a block diagram showing the elements of the invention.

The mobile traffic camera system as depicted in the block diagram of FIG. 1, comprises a plurality of data sources 1, each of which comprises a set of equipment disposed within a vehicle. The set of equipment includes, a digital video camera 2, a video image compressor 3, a global positioning system (GPS) receiver 4 and a data transmitter 5. The GPS receiver 4 and the data transmitter 5 include antennae 6 for transmitting and receiving signals in performing their typical functions.

The mobile traffic camera system further comprises a central repository 7 comprising a plurality of data receivers 8, each of which is capable of receiving data from a data source 1 and a computer processor 9, which is programmed and configured to receive simultaneously, from a plurality of data receivers 8, data consisting of streaming video, stamped with time and location markers and with source identification and to process, store, retrieve and display said data.

As to each data source 1, the digital video camera 2 is positioned so as to capture the forward looking view from the vehicle. It is desirable that the digital video camera 2 be secured in position and set to operate continually, while the vehicle is in operation. It is also desirable that the vehicle travel in an area or areas of interest designated by the system. While the data source vehicle is in operation, the digital video camera 2 continually captures and digitizes the image of the forward looking view, from the vehicle. The digital video camera 2 is connected preferably by wire cable, to the video image compressor 3, which reduces the logical size of each video image.

The video image compressor 3 is connected, preferably by wire cable, to the data transmitter 5. A continuous stream of compressed video image data is transferred immediately to the data transmitter 5. The GPS 4 is connected, preferably by wire cable, to the data transmitter 5. A continuous series of position indicators, in the form of latitude and longitude are transferred to the data transmitter 5. The data transmitter 5 is configured to periodically and repeatedly stamp the compressed video image data with the GPS data consisting of latitude and longitude, the associated time and a source identification. The data transmitter 5 continuously transmits the compressed video image data which has been stamped with position, time and source identification data to produce a continuous bit stream consisting of compressed video image data, with stamps of position, time and source identification at intervals.

The data receivers 8 receive the transmitted data, from the data sources 1. The data receivers 8 are connected to the computer processor 9 and transfer the data, preferably by wire cable to the computer processor 9. The computer processor 9 receives the streaming video data, stamped with location and time, and source identification markers continuously and simultaneously from the plurality of data receivers 8.

The computer processor 9 is programmed to include a geo-location table, FIG. 2, which converts latitude and longitude to a road location identification which consists of a road name/route number and mile marker but does not include a direction of travel indicator. The computer processor 9 performs an additional step by comparing the road location identification derived from successive stamps and processing the group of at least two road location identifications on an additional table to produce road vector label including a road location identification and a direction indicator, which road vector label is appended to the data within the continuous bit stream at the point of each stamp in the group.

It is desirable that the computer processor 9 is programmed and configured to compare the road vector label with a table of pre-determined road vectors which are marked as being of interest or not of interest. This process of comparison is repeated for each stamp on the data being received and the computer processor 9 will store only data which is marked as being of interest. It is to be further understood that the table which assigns the designation that a road vector is of interest or not of interest is to be configured so that an operator of the system could easily vary the designations within the table either manually, for example, to monitor a special event, or by additional programming of the computer processor 9 to alter the table designations according to a regular calendar schedule.

An alternative configuration of the system includes a data transmitter/receiver as part of each data source 1, set to transmit only location and time data and source identification. The data source 1 of the alternative configuration is configured to transmit compressed video image data only after receiving a signal from the central repository 7. Further, the central repository 7 includes a plurality of data receiver/transmitters configured to transmit a signal to the data source 1, which causes the transmission of video image data to begin. The computer processor 9 is programmed and configured to cause one or more receiver/transmitters to transmit the signal to one or more data sources 1, when the data being received from one or more data sources 1 has been identified as being, a road vector which is designated of interest. It will be appreciated that this alternative embodiment requires data handling devices which transmit and receive data, located in each data source and in the central repository 7; thereby increasing the expense compared to the preferred embodiment which includes data transmitters 5 in each data source 1 and data receivers 8 in the central repository 7. The alternative configuration has the advantage of reducing data traffic by restricting the transmission of video image data.

An additional feature of the preferred embodiment of the system is that the computer processor 9 is programmed and configured to calculate the speed of the data source 1 by analyzing the road vectors and associated time included with the data, for a first group of two or more consecutive stamps to calculate the speed of the data source 1. The speed, as calculated, is appended to each of the stamps, from which the road vector was read, for the calculation, and the process is repeated for a second group of consecutive stamps and continually repeated until all stamps have been included in a group. Current technology provides a number of methods by which vehicle speed can be determined and transmitted to a central repository and it is not the intention of this applicant to limit the invention to the best known method, which is set forth herein.

It is desirable that the computer processor 9 is programmed and configured to compare the road vector label, assigned to data being received, with the road vector label, of data being received simultaneously from other data sources 1 and to not select for storage, data being received from multiple data sources 1 traveling in the same direction, on the same route and in close proximity. In the preferred embodiment, the computer processor 9 is programmed and configured to compare, periodically, at intervals of five seconds, the following criteria: road vector, time, speed and source identification of all data sources 1 being received and, if two or more data sources 1 have had matching road vectors, within a time interval of less than two minutes, to not store the data from the data source 1 with a lower calculated average speed, over the time interval.

The computer processor 9 assigns a video stream identification and a day number to the data, which is selected to be stored. The video stream identification uniquely identifies a set of video image data which depicts a continuous and coherent view from a vehicle traveling along a route of interest. The computer processor 9 includes a calendar. The computer processor 9 is programmed and configured to mark the data with the calendar day number at the point of the stamp selected to be stored and to number the stream of data with an integer, unique as to all other data bearing the same calendar day number, marking the data at the point of the stamp. The source identification appended with the calendar day number and the assigned integer comprises the video stream identification. The stream of data following the stamp is stored. The next stamp selected to be stored is analyzed by comparing the road vector to the road vector of the preceding stamp, for data from the same data source. If the road names/route numbers and direction indicators match, the computer processor 9 assigns the same integer to the source identification, and stores the data following the stamp as part of the same video stream with the same video stream identification. The process continues for each succeeding stamp, from the same data source 1, until a stamp is received with a road name/route number or direction indicator, which does not match. If the vehicle is still operating on a route of interest, the computer processor 9 assigns another integer to the stamp, from the same data source, which includes the non-matching road name/route number or direction indicator, to establish a separate video stream identification for the data following that stamp. The data following that stamp is stored, being marked with the separate video stream identification. The process is repeated for each stamp, from the same data source 1. It should be noted that the computer processor 9 performs the same process for multiple data sources 1 simultaneously and the computer processor 9 changes the calendar day number according to its calendar.

The computer processor 9 is programmed and configured with a results table, FIG. 3, to identify the most recent data for each road vector. The results table is constructed to receive entries for each road vector and is arranged sequentially. The data which has been selected for storage is processed by comparing each time-location stamp with the entry, on the results table, which corresponds to the road vector of the time-location stamp to determine which data is the most recent and if the data being processed is more recent than the entry on the results table, or if there is no entry on the results table for the road vector, by writing the video stream identification of the data being processed and the calculated speed as a current entry on the results table. This will overwrite an existing entry, if one exists, on the results table. The computer processor 9 is programmed and configured to compute the time offset, from the first time-location stamp on data selected to be stored, having the same video stream identification and enter the time offset in the results table. The computer processor 9 is further programmed and configured to periodically check the entries sequentially, by road vector and to compare the video stream identification of each sequential entry. If the video stream identification does not match the previous entry, the computer processor 9 enters the video stream identification of the unmatched road vector as the subsequent video stream, in the results table, for all of the previously compared road vectors having matching video stream identifications. The computer processor 9 repeats the process for all road vector entries on the results table.

In the best mode embodiment, the computer processor 9 is programmed and configured to display a map of the roads comprising the road vectors, which are marked as being of interest. For each road vector of interest, the speed from the results table is displayed. It will be appreciated that this can be accomplished in a number of ways. In the embodiment of the best mode, each road vector is displayed in a color according to a key which correlates a particular color to a particular range of speeds. For example, a speed below 30 miles per hour would cause the road vector to be displayed in red. A speed between 30 miles per hour and the posted speed limit would cause the road vector to be displayed in yellow and a speed above the posted speed limit would cause the road vector to be displayed in green. It will be appreciated that the computer processor 9 could be programmed and configured to alter the granularity of the display for easier viewing, treating certain pre-determined sets of contiguous road vectors as a group and to display the color which is keyed to the average speed of all road vectors in the group, for every road vector in the group.

The computer processor 9 is programmed and configured to receive an inquiry from a user, said inquiry consisting of the identification of a road vector. In the best mode embodiment, the road vector would be selected with a mouse or other device to select the x-y coordinates which correspond to a specified road vector. The computer processor 9 is programmed and configured to retrieve and display the streaming video data from the data source 1 identified on the results table, starting from the selected road vector. For example, a user would place the mouse pointer on a northbound section of road I-95 as shown by a map displayed on a video monitor. The x-y coordinates of the selected location correspond to a particular road vector, for example, Northbound I-95 at mile 57.2. The streaming video from the data source 1 entered on the results table, for road vector 95N 57.2 would be displayed as a continuous stream of video images starting from the selected location. If the stream of video images does not continue through all successive road vectors on the results table, the computer processor 9 is programmed to locate the subsequent video stream from the results table entry for the next consecutive road vector to retrieve and display video image data from the subsequent video stream commencing at the next consecutive road vector following the road vector last displayed from the initially selected video stream.

In the preferred embodiment, the computer processor 9 would be programmed and configured to display the road location, direction of travel and the time associated with the recorded streaming video data. Additionally, it will be appreciated that known means can be used to retrieve data having prescribed labels or markers and that known means can be used to perform arithmetic operations on the data. For example, the system could be used to calculate the average speed of the data source vehicles at a certain location, at a certain time of day. This information could be used to estimate or predict the speed of traffic in that location at that time of day. Also, the video image of a particular location, at a particular date and time could be retrieved, at a future date.

The applicant claims:

1. A data processing device programmed and configured for storing, retrieving and displaying digital video images comprising;
   - means to continuously and simultaneously receive, from a plurality of mobile sources, streaming video data, stamped, at intervals repeatedly, with time, location and source identification;
   - means to convert the time and location to matching road vectors, selected from a geo-location table;
   - means to stamp the streaming video data, at intervals, repeatedly, with the selected road vectors;
   - means to process the road vectors, time and source identification, from stamped streaming video data, to determine and enter, as to each road vector, the identification of a most recent streaming video data;
   - means to store the stamped streaming video data;
   - means to retrieve and display the most recent streaming video representing a coherent view of one or more road vectors presented consecutively.

2. The data processing device of claim 1, further comprising means to compare the road vectors and times to a predetermined table of road vectors which are of interest and to not store stamped streaming video data which is not within the predetermined table.

3. The data processing device of claim 1, further comprising means to calculate, store, retrieve and display the speed of one or more of the sources in one or more road vectors.

4. The data processing device of claim 3, further comprising means to compare the road vectors, times and source identifications of stamped streaming video data being received simultaneously from a plurality of sources and to not store the stamped streaming video data from one of more sources, according to predetermined matching criteria.

5. A process for storing, retrieving and displaying digital video images comprising the steps of;
   - continuously and simultaneously receiving, from a plurality of mobile sources, streaming video data, stamped, at intervals repeatedly, with time, location and source identification;
   - converting the time and location to matching road vectors selected from a geo-location table;
   - stamping the streaming video data, at intervals repeatedly with the selected road vectors;
   - processing the road vectors, time and source identifications of the stamped streaming video data to determine and enter, as to each road vector, the identification of a most recent streaming video data;
   - storing the stamped streaming video data;
   - retrieving and displaying the most recent streaming video representing a coherent view of one or more road vectors presented consecutively.

6. The process of claim 5, wherein the step of stamping the streaming video data is followed by an additional step comprising the step of comparing the road vectors and times to a predetermined table of road vectors which are of interest and to not store stamped streaming video data which is not within the predetermined table.

7. The process of claim 5, wherein the step of stamping the streaming video data is followed by an additional step of processing the stamped streaming video data to calculate, store, retrieve and display the speed of one or more of the sources in one or more road vectors.

8. The process of claim 7, wherein the step of stamping the streaming video data is followed by an additional step comprising the step of comparing the road vectors, times and source identifications of stamped streaming video data, being received simultaneously from a plurality of sources and to not store the stamped streaming video data from one or more sources, according to predetermined matching criteria.

* * * * *